(12) United States Patent
Kim et al.

(10) Patent No.: US 10,289,328 B2
(45) Date of Patent: May 14, 2019

(54) MEMORY CONTROLLER AND METHOD FOR HANDLING HOST REQUEST BASED ON DATA CHARACTER

(71) Applicant: SK hynix Inc., Gyeonggi-do (KR)

(72) Inventors: Hyun-Jun Kim, Gyeonggi-do (KR); Joong-Seob Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 156 days.

(21) Appl. No.: 15/244,601

(22) Filed: Aug. 23, 2016

(65) Prior Publication Data

US 2017/0255413 A1    Sep. 7, 2017

(30) Foreign Application Priority Data

Mar. 3, 2016  (KR) .................... 10-2016-0025661

(51) Int. Cl.
*G06F 3/06* (2006.01)

(52) U.S. Cl.
CPC ............ *G06F 3/0631* (2013.01); *G06F 3/061* (2013.01); *G06F 3/0604* (2013.01); *G06F 3/0644* (2013.01); *G06F 3/0659* (2013.01); *G06F 3/0673* (2013.01); *G06F 3/0688* (2013.01)

(58) Field of Classification Search
None
See application file for complete search history.

(56) References Cited

U.S. PATENT DOCUMENTS

| 7,350,040 | B2 | 3/2008 | Marinescu | |
|---|---|---|---|---|
| 2012/0166749 | A1* | 6/2012 | Eleftheriou | ........... G06F 3/0616 711/165 |
| 2012/0323977 | A1* | 12/2012 | Fortier | .............. G06F 17/30091 707/812 |
| 2017/0013046 | A1* | 1/2017 | Flynn | ...................... H04L 67/06 |

FOREIGN PATENT DOCUMENTS

KR        1020000061779        10/2000

\* cited by examiner

*Primary Examiner* — Gary W. Cygiel
(74) *Attorney, Agent, or Firm* — IP & T Group LLP

(57) ABSTRACT

A method for managing a memory includes: receiving a write request from a host; selecting an internal storage region among a plurality of internal storage regions of the memory based on data characterization information of a data received from a host according to the write request from a host; generating a metadata including the data characterization information of the data according to the write request; and storing the metadata along with the data in the selected internal storage region.

14 Claims, 6 Drawing Sheets

MEMORY CONTROLLER AND METHOD FOR HANDLING HOST REQUEST BASED ON DATA CHARACTER

CROSS-REFERENCE TO RELATED APPLICATIONS

The present application claims priority under 35 U.S.C. § 119(a) to Korean Patent Application No. 10-2016-0025661 filed on Mar. 3, 2016, which is incorporated herein by reference in its entirety.

BACKGROUND

1. Field

Exemplary embodiments of the present invention relate generally to a semiconductor designing technology and, more particularly, to a memory controller and method for managing memory.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. These portable electronic devices generally use a memory system (also referred to as a data storage device) having one or more semiconductor memory devices for storing data. The memory system may be used as a main memory device or an auxiliary memory device of a portable electronic device.

Memory systems may provide excellent stability, durability, high information access speed, and low power consumption, since they have no moving parts. Examples of memory systems include universal serial bus (USB) memory devices, memory cards having various interfaces, and solid state drives (SSD).

SUMMARY

Embodiments of the present invention are directed to a memory controller for a memory system and a method for efficiently managing a storage region of a semiconductor memory included in the memory system.

In accordance with an embodiment of the present invention, a method for managing a memory, may include: receiving a write request from a host; selecting an internal storage region among a plurality of internal storage regions of the memory based on data characterization information of a data received from a host according to the write request from a host; generating a metadata including the data characterization information of the data according to the write request; and storing the metadata along with the data in the selected internal storage region.

The method may further include: receiving a read request for the data received from the host, after the data is stored along with the metadata in the selected internal storage region, selecting one internal storage region among the plurality of the internal storage regions based on the data characterization information of the data according to the read request; reading the metadata corresponding to the data according to the read request out of the selected internal storage region, which is selected based on the data characterization information of the data according to the read request; determining whether the data characterization information of the data according to the write request that is included in the read metadata is the same as the data characterization information of the data according to the read request; and reading the data according to the read request out of the selected internal storage region, which is selected based on the data characterization information of the data according to the read request when the data characterization information of the data according to the write request that is included in the read metadata is the same as the data characterization information of the data according to the read request.

The method may further include: when the data characterization information of the data according to the write request that is included in the read metadata is not the same as the data characterization information of the data according to the read request, not reading the data according to the read request.

The method may further include: transferring data characteristics discrepancy and read failure information to the host.

the storing of the metadata along with the data in the selected internal storage region may include: checking out whether a sum of a size of the data and a size of the metadata is greater than a size of an empty space of the selected internal storage region, which is selected based on the data characterization information of the data according to the write request.

The checking out of whether the sum of the size of the data and the size of the metadata is greater than the size of the empty space of the selected internal storage region, which is selected based on the data characterization information of the data according to the write request may include: calculating a size of an address region corresponding to the sum, and comparing the calculated size of the address region with a size of a selected address region corresponding to the empty space of the selected internal storage region, which is selected based on the data characterization information of the data according to the write request; when the calculated size of the address region is greater than the size of the selected address region, confirming that the size of the sum is greater than the size of the selected internal storage region; and when the calculated size of the address region is not greater than the size of the selected address region, confirming that the size of the sum is not greater than the size of the selected internal storage region.

The storing of the metadata along with the data in the selected internal storage region may further include: when the sum of the size of the data and the size of the metadata is not greater than the size of the empty space of the selected internal storage region, storing the data and the metadata in the selected internal storage region, which is selected based on the data characterization information of the data according to the write request.

The storing of the metadata along with the data in the selected internal storage region may further include: when the sum of the size of the data and the size of the metadata is greater than the size of the empty space of the selected internal storage region, not storing the data and the metadata in the selected internal storage region, which is selected based on the data characterization information of the data according to the write request.

The storing of the metadata along with the data in the selected internal storage region may further include: when the sum of the size of the data and the size of the metadata is greater than the size of the empty space of the selected internal storage region, transferring overflow and storage failure information to the host.

In accordance with an embodiment of the present invention, a memory controller, may include: a memory; and a processor. The processor may be suitable for: dividing a storing region of the memory into a plurality of internal storage regions; selecting one internal storage region among the plurality of the internal storage regions based on data characterization information of a data according to a write request from a host; generating a metadata including the data characterization information of the data according to the write request; and storing the metadata along with the data in the selected internal storage region.

The processor may be further suitable for: when a read request for the data is received from the host, after the data is stored along with the metadata in the selected internal storage region, selecting one internal storage region among the plurality of the internal storage regions based on the data characterization information of the data according to the read request; reading the metadata corresponding to the data according to the read request out of the selected internal storage region, which is selected based on the data characterization information of the data according to the read request, and figuring out whether the data characterization information of the data according to the write request that is included in the read metadata is the same as the data characterization information of the data according to the read request; and when the data characterization information of the data according to the write request that is included in the read metadata is the same as the data characterization information of the data according to the read request, reading the data according to the read request out of the selected internal storage region, which is selected based on the data characterization information of the data according to the read request.

The processor may be further suitable for: when the data characterization information of the data according to the write request that is included in the read metadata is not the same as the data characterization information of the data according to the read request, not reading the data according to the read request.

The processor may be further suitable for: transferring data characteristics discrepancy and read failure information to the host.

The processor may be further suitable for: checking out whether a sum of a size of the data and a size of the metadata is greater than a size of an empty space of the selected internal storage region, which is selected based on the data characterization information of the data according to the write request.

The processor may be further suitable for checking out whether a sum of a size of the data and a size of the metadata is greater than a size of an empty space of the selected internal storage region, which is selected based on the data characterization information of the data according to the write request by including: calculating a size of an address region corresponding to the sum, and comparing the calculated size of the address region with a size of a selected address region corresponding to the empty space of the selected internal storage region, which is selected based on the data characterization information of the data according to the write request; when the calculated size of the address region is greater than the size of the selected address region, confirming that the size of the sum is greater than the size of the selected internal storage region; and when the calculated size of the address region is not greater than the size of the selected address region, confirming that the size of the sum is not greater than the size of the selected internal storage region.

The processor may be further suitable for: when the sum of the size of the data and the size of the metadata is not greater than the size of the empty space of the selected internal storage region, storing the data and the metadata in the selected internal storage region, which is selected based on the data characterization information of the data according to the write request.

The processor may be further suitable for: when the sum of the size of the data and the size of the metadata is greater than the size of the empty space of the selected internal storage region, not storing the data and the metadata in the selected internal storage region, which is selected based on the data characterization information of the data according to the write request.

The processor may be further suitable for: when the sum of the size of the data and the size of the metadata is greater than the size of the empty space of the selected internal storage region, transferring overflow and storage failure information to the host.

BRIEF DESCRIPTION OF THE DRAWINGS

The above and other features and advantages of the present invention will become more apparent to those skilled in the art to which the present invention belongs by describing in detail specific embodiments thereof with reference to the attached drawings.

DETAILED DESCRIPTION

Figure 1:
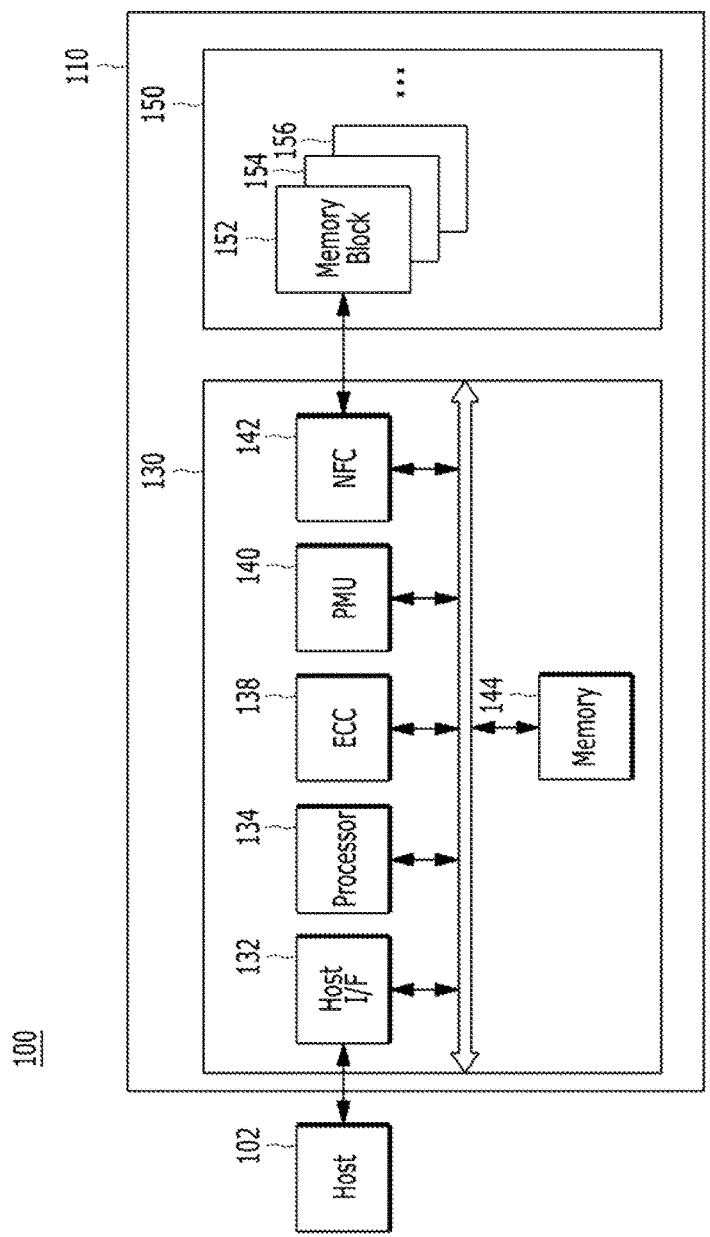
FIG. 1 is a simplified diagram of a data processing system including a memory system, according to an embodiment of the present invention.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings. Throughout the disclosure, like reference numerals refer to like parts throughout the various figures and embodiments of the present invention.

Referring now to FIG. 1 a data processing system 100 including a memory system 110 is provided, according to an embodiment of the present invention. The data processing system 100 may include a host 102 operatively coupled to the memory system.

The host 102 may include a portable electronic device, such as, a mobile phone, an MP3 player and a laptop computer, or a fixed electronic device, such as, a desktop computer, a game player, a television (TV) and a projector.

The memory system 110 may operate in response to a request from the host 102. In particular, the memory system 110 may store data to be accessed by the host 102. The memory system 110 may be used as a main memory system or an auxiliary memory system of the host 102. The memory system 110 may be implemented as any one of various kinds of storage devices, according to the protocol of a host interface to be electrically coupled with the host 102. For example, the memory system 110 may be implemented as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented as a volatile memory device, such as, a dynamic random access memory (DRAM) and a static random access memory (SRAM) or a nonvolatile memory device, such as, a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 for storing data to be accessed by the host 102, and a controller 130 for controlling the operation of the memory device 150 and its interfacing with the host.

The controller 130 and the memory device 150 may be integrated into a single semiconductor device. For instance, the controller 130 and the memory device 150 may be integrated into a single semiconductor device configured as a solid state drive (SSD). When the memory system 110 is used as an SSD, the operation speed of the host 102 that is electrically coupled with the memory system 110 may be significantly increased.

The controller 130 and the memory device 150 may be integrated into a single semiconductor device configured as a memory card. The controller 130 and the memory card 150 may be integrated into a single semiconductor device configured as a memory card, such as, a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may be configured as a storage device of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

In an embodiment, the memory device 150 may be a nonvolatile memory device capable of retaining stored data therein even when power supply is interrupted. The memory device 150 may store data provided from the host 102 during a write operation, and may also provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells. In an embodiment, a page includes a plurality of memory cells coupled to the same word line. In an embodiment the memory device 150 may be a flash memory having a three-dimensional (3D) stack structure.

The controller 130 may control the memory device 150 in response to a request received from the host 102. The controller 130 may control the operations of the memory device 150, including, for example, read, write, program and erase operations. For example, the controller 130 may provide data read from the memory device 150 to the host 102 in response to a read request received for the host 102. Also, for example, the controller 130 may store data provided from the host 102 to the memory device 150, in response to a program (write) request received for the host 102.

According to the illustrated embodiment of FIG. 1, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols, such as a universal serial bus (USB), a multimedia card (MMC), a peripheral component Interconnect-express (PCI-E), a serial attached SCSI (SAS), a serial advanced technology attachment (SATA), a parallel advanced technology attachment (PATA), a small computer system interface (SCSI), an enhanced small disk interface (ESDI), and an integrated drive electronics (IDE).

The ECC unit 138 may detect and correct errors in the data read from the memory device 150 during a read operation. The ECC unit 138 may not correct error bits when the number of the error bits is greater than or equal to a threshold number of correctable error bits, and may output an error correction fall signal indicating a failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices that are suitable for the error correction operation.

The PMU 140 may provide and manage power for the controller 130, that is, power for the component elements included in the controller 130. PMUs are well-known in the art, hence, further details thereof are omitted. Any suitable PMU may be employed.

The NFC 142 is an example of a suitable memory interface between the controller 130 and the memory device 150 when the memory device 150 is a NAND flash memory device. The NFC 142 provides and interface to allow the controller 130 to control the memory device 150 in response to a request from the host 102. The NFC 142 may also generate control signals for the memory device 150 and process data under the control of the processor 134. When the memory device 150 is not a NAND flash memory a different suitable interface may be employed among many well-known memory interfaces in the art.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory. The memory 144 may be implemented for example with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control the operations of the memory system 110. For example, the processor 134 may control a write operation or a read operation for the memory device 150, in response to a write request or a read request from the host 102. The processor 134 may drive firmware, which is referred to as a flash translation layer (FTL), to control the operations of the memory system 110. The processor 134 may be implemented, for example, with a microprocessor or a central processing unit (CPU).

A management unit (not shown) may be included in the processor 134 for performing bad block management for the memory device 150. For example, the management unit may find bad memory blocks included in the memory device 150, which are in unsatisfactory condition for further use, and perform bad block management on the bad memory blocks. When the memory device 150 is a flash memory (e.g., a NAND flash memory), a program failure may occur during the write operation (i.e., the program operation), due to characteristics of a NAND logic function. During the bad block management, the data of the program-failed memory block or the bad memory block may be programmed into a new memory block. Bad blocks due to a program fail may seriously deteriorate the utilization efficiency of the memory device 150 and the overall reliability of the memory system 100. Hence, reliable bad block management may be included.

Figure 2:
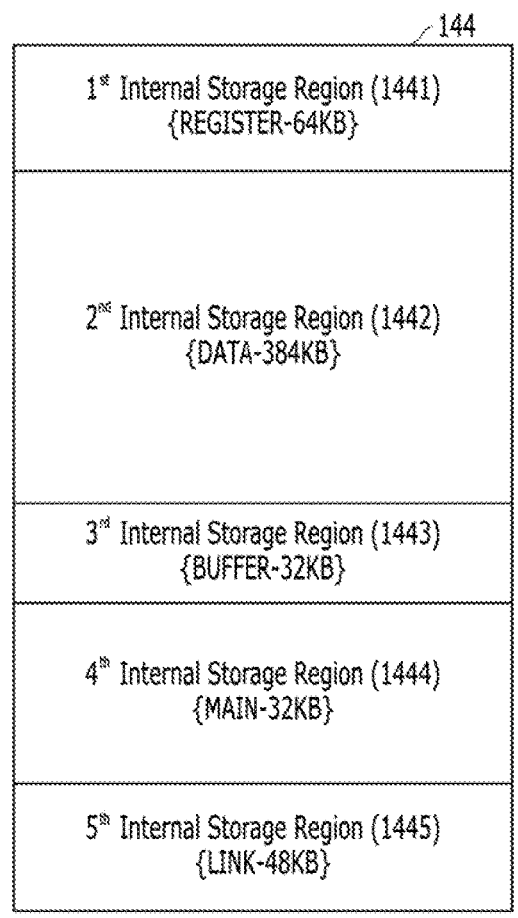
FIG. 2 illustrates a memory among the constituent elements of a memory system shown in FIG. 1.

FIG. 2 illustrates a configuration example of the memory 144 of the memory system 110 shown in FIG. 1. More specifically, FIG. 2 shows how the storage region of the memory 144 among the constituent elements of the memory system 110 shown in FIG. 1 may be organized.

As mentioned with reference to FIG. 1, the memory 144 may be used for many purposes. For example, the memory 144 may store data needed to perform a data write operation between the host 102 and the memory device 150. For another example, the memory 144 may store data needed to perform a data read operation between the host 102 and the memory device 150. The memory 144 may include a program memory, a data memory, a write buffer, a read buffer, and a map buffer to store the data needed to perform a data write operation and a data read operation between the host 102 and the memory device 150.

The storage region of the memory 144 included in the memory system 110 may be divided into a plurality of internal storage regions according to how the host 102 uses the memory system 110. For example, as shown in FIG. 2, the storage region of the memory 144 may be divided into five internal storage regions, i.e., a first internal storage region 1441, a second internal storage region 1442, a third internal storage region 1443, a fourth internal storage region 1444, and a fifth internal storage region 1445 according to how the host 102 uses the memory system 110. As illustrated, the first internal storage region 1441 may be a register region REGISTER for temporarily storing a data or a signal that is transferred in the inside of the memory system 110. The second internal storage region 1442 may be a data storage memory region DATA for storing a data during a write operation and/or a read operation between the host 102 and the memory device 150. The third internal storage region 1443 may be a buffer region BUFFER for buffering a data during a write operation and/or a read operation between the host 102 and the memory device 150. The fourth internal storage region 1444 may be a main memory region MAIN for storing a firmware code for controlling the operation in the inside of the memory system 110. The fifth internal storage region 1445 may be a link region LINK for storing an address map table.

The structure shown in FIG. 2 is a mere example, and the storage region of the memory 144 may be divided into more internal storage regions or less internal storage regions than the first to fifth internal storage regions 1441-1445 and managed according to how the host 102 uses the memory system 110. In the illustrated embodiment of FIG. 2, as an example, it is provided that the first storage region 1441 has a size of 64 KB, the second storage region 1442 has a size of 384 KB, the third storage region 1443 has a size of 32 KB, the fourth storage region 1444 has a size of 32 KB, and the fifth storage region 1445 has a size of 48 KB. It is noted, however, that the size of each internal storage region may be changed according to design.

Figure 3:
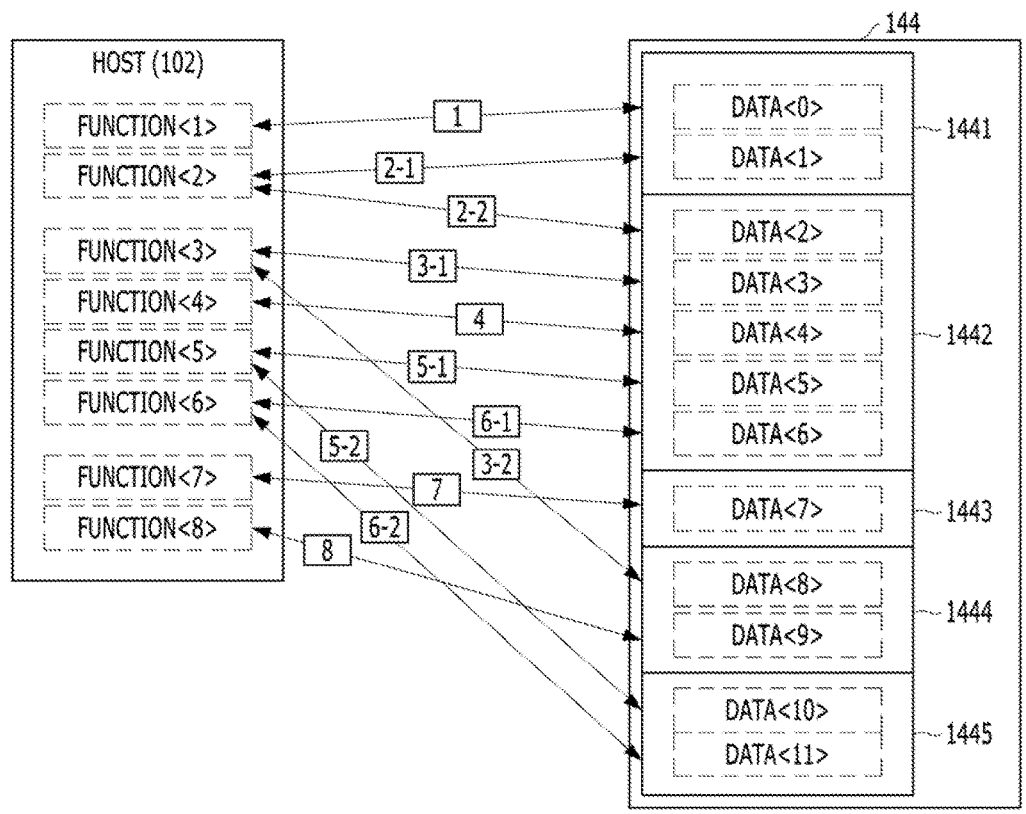
FIG. 3 illustrates how the memory of FIG. 2 is related with a usage method of a host.

FIG. 3 illustrates how the memory 144 of FIG. 2 is related with the operations of the host 102 of FIG. 1.

Referring to FIG. 3, a plurality of operations FUNCTION<1:8> are performed in the host 102. The storage region of the memory 144 included in the memory system 110 is divided into a plurality of internal storage regions 1441, 1442, 1443, 1444 and 1445, which respectively correspond to the operations FUNCTION<1:8>.

First, it is assumed, for illustration purposes that a total of 8 operations FUNCTION<1:8> are performed in the host 102. Herein, the 8 operations FUNCTION<1:8> may be the operations of reading/writing/erasing data from/to the memory device 150 of the memory system 110, and the operations of testing, debugging, coding, and verifying the memory system 110. In short, the operations FUNCTION<1:8> may represent all the operations performed by the host 102 for controlling the memory system 110.

Herein, the multiple operations FUNCTION<1:8> performed in the host 102 are illustrated to be eight operations, but this is for the sake of convenience in description. It is noted, more or less operations than the 8 operations may be performed in the host.

Also, as described with reference to FIG. 2, the memory 144 included in the memory system 110 is assumed to include the first to fifth internal storage regions 1441, 1442, 1443, 1444 and 1445.

Herein, it is further assumed that only the first internal storage region 1441 of the storage region of the memory 144 is accessed during a first operation FUNCTION<1> performed in the host 102 (1). In other words, it is assumed that data are inputted or outputted to/from the first internal storage region 1441 of the storage region of the memory 144 during the first operation FUNCTION<1> performed in the host 102, and that no data are inputted/outputted to/from the remaining second to fifth internal storage regions 1442, 1443, 1444 and 1445.

Also, it is assumed that only the first internal storage region 1441 and the second internal storage region 1442 of the storage region of the memory 144 are accessed during a second operation FUNCTION<2> performed in the host 102 as denoted by arrows 2-1 and 2-2. In other words, it may be assumed that data are inputted/outputted to/from the first internal storage region 1441 and the second internal storage region 1442 of the storage region of the memory 144 during the second operation FUNCTION<2> performed in the host 102, and that data are not inputted/outputted to/from the third to fifth internal storage regions 1443, 1444 and 1445.

Also, it is assumed that only the second internal storage region 1442 and the fourth internal storage region 1444 of the storage region of the memory 144 are accessed during a third operation FUNCTION<3> performed in the host 102 as denoted by arrows 3-1 and 3-2. In other words, it may be assumed that data are inputted/outputted to/from the second internal storage region 1442 and the fourth internal storage region 1444 of the storage region of the memory 144 during the third operation FUNCTION<3> performed in the host 102, and that data are not inputted/outputted to/from the first internal storage region 1441, the third internal storage region 1443, and the fifth internal storage region 1445.

Also, it is assumed that only the second internal storage region 1442 of the storage region of the memory 144 are accessed during a fourth operation FUNCTION<4> performed in the host 102 (4). In other words, it may be assumed that data are inputted/outputted to/from the second internal storage region 1442 of the storage region of the memory 144 during the fourth operation FUNCTION<4> performed in the host 102, and that data are not inputted/outputted to/from the first internal storage region 1441, the third internal storage region 1443, the fourth internal storage region 1444 and the fifth internal storage region 1445.

Also, it is assumed that only the second internal storage region 1442 and the fifth internal storage region 1445 of the storage region of the memory 144 are accessed during a fifth operation FUNCTION<5> performed in the host 102 (5-1 and 5-2). In other words, it may be assumed that data are inputted/outputted to/from the second internal storage region 1442 and the fifth internal storage region 1445 of the storage region of the memory 144 during the fifth operation FUNCTION<5> performed in the host 102, and that data are not inputted/outputted to/from the first internal storage region 1441, the third internal storage region 1443, and the fourth internal storage region 1444.

Also, it is assumed that the second internal storage region 1442 and the fifth internal storage region 1445 of the storage region of the memory 144 are accessed during a sixth operation FUNCTION<6> performed in the host 102 (6-1 and 6-2). In other words, it may be assumed that data are inputted/outputted to/from the second internal storage region 1442 and the fifth internal storage region 1445 of the storage region of the memory 144 during the sixth operation FUNCTION<6> performed in the host 102, and that data are not inputted/outputted to/from the first internal storage region 1441, the third internal storage region 1443, and the fourth internal storage region 1444.

Also, it is assumed that only the third internal storage region 1443 of the storage region of the memory 144 are accessed during a seventh operation FUNCTION<7> performed in the host 102 (7). In other words, it may be assumed that data are inputted/outputted to/from the third internal storage region 1443 of the storage region of the memory 144 during the seventh operation FUNCTION<7> performed in the host 102, and that data are not inputted/outputted to/from the first internal storage region 1441, the second internal storage region 1442, the fourth internal storage region 1444 and the fifth internal storage region 1445.

Also, it is assumed that only the fourth internal storage region 1444 of the storage region of the memory 144 are accessed during an eighth operation FUNCTION<8> performed in the host 102 (8). In other words, it may be assumed that data are inputted/outputted to/from the fourth internal storage region 1444 of the storage region of the memory 144 during the eighth operation FUNCTION<8> performed in the host 102, and that data are not inputted/outputted to/from the first internal storage region 1441, the second internal storage region 1442, the third internal storage region 1443, and the fifth internal storage region 1445.

Each of the above described operations FUNCTION<1:8> performed in the host 102 is performed by selecting and accessing a predetermined internal storage region among the multiple internal storage regions 1441, 1442, 1443, 1444 and 1445 included in the memory 144 according to the characteristics of the operation.

Therefore, it may be seen that an internal storage region may be accessed for at least one of the operations performed in the host 102.

For example, as illustrated in FIG. 3, the first internal storage region 1441 of the storage region of the memory 144 is accessed when the first operation FUNCTION<1> or the second operation FUNCTION<2> is performed in the host 102, and data DATA<0:1> are stored in the first internal storage region 1441.

Also, the second internal storage region 1442 of the storage region of the memory 144 is accessed when the second operation FUNCTION<2>, the third operation FUNCTION<3>, the fourth operation FUNCTION<4>, the fifth operation FUNCTION<5>, or the sixth operation FUNCTION<6> is performed in the host 102, and data DATA<2:6> are stored in the second internal storage region 1442.

Also, the third internal storage region 1443 of the storage region of the memory 144 is accessed when the seventh operation FUNCTION<7> is performed in the host 102, and a data DATA<7> is stored in the third internal storage region 1443.

Also, the fourth internal storage region 1444 of the storage region of the memory 144 is accessed when the third operation FUNCTION<3> or the eighth operation FUNCTION<8> is performed in the host 102, and data DATA<8:9> are stored in the fourth internal storage region 1444.

Also, the fifth internal storage region 1445 of the storage region of the memory 144 is accessed when the fifth operation FUNCTION<5> or the sixth operation FUNCTION<6> is performed in the host 102, and data DATA<10:11> are stored in the fifth internal storage region 1445.

As described above, each of the internal storage regions 1441, 1442, 1443, 1444 and 1445 included in the memory 144 may be accessed through one, two or more operations among the multiple operations FUNCTION<1:8> performed in the host 102, dependent upon the characteristics of each operation.

Meanwhile, the memory system 110 does not know what operation makes the data DATA<0:11> stored in the internal storage regions 1441, 1442, 1443, 1444 and 1445 included in the memory 144. Only the host 102 may know what operation makes the data DATA<0:11> stored in the internal storage regions 1441, 1442, 1443, 1444 and 1445 included in the memory 144.

For example, the data DATA<2:6> may be stored in the second Internal storage region 1442 of the storage region of the memory 144 included in the memory system 110 through the second operation FUNCTION<2>, the third operation FUNCTION<3>, the fourth operation FUNCTION<4>, the fifth operation FUNCTION<5>, or the sixth operation FUNCTION<6> among the multiple operations FUNCTION<1:8> that may be performed in the host 102. Herein, what data is stored in the second internal storage region 1442 through which operation is known in the host 102. However, the memory system 110 does not know which operation of the host 102 makes the data DATA<2:6> stored in the second internal storage region 1442 of the memory 144.

Herein, when the operations FUNCTION<1:8> performed in the host 102 are normally processed without an error, it does not matter whether the memory system 110 does or does not know what data DATA<0:11> are stored in the internal storage regions 1441, 1442, 1443, 1444 and 1445 of the memory 144, because the host 102 knows what data DATA<0:11> are stored in the internal storage regions 1441, 1442, 1443, 1444 and 1445 of the memory 144 and properly manages the data DATA<0:11>.

However, the operations FUNCTION<1:8> being processed normally without an error in the host 102 is just an ideal case. The reality is that some of the operations FUNCTION<1:8> may not be normally processed due to a reason which is unknown in the host 102.

If malfunction occurs in some of the operations FUNCTION<1:8> performed in the host 102 and thus information on what data DATA<0:11> are stored in the internal storage regions 1441, 1442, 1443, 1444 and 1445 of the memory 144 is lost, the data stored in some internal storage regions of the internal storage regions 1441, 1442, 1443, 1444 and 1445 may be managed erroneously, which may lead to an abnormal operation of the memory system 110.

Figure 4:
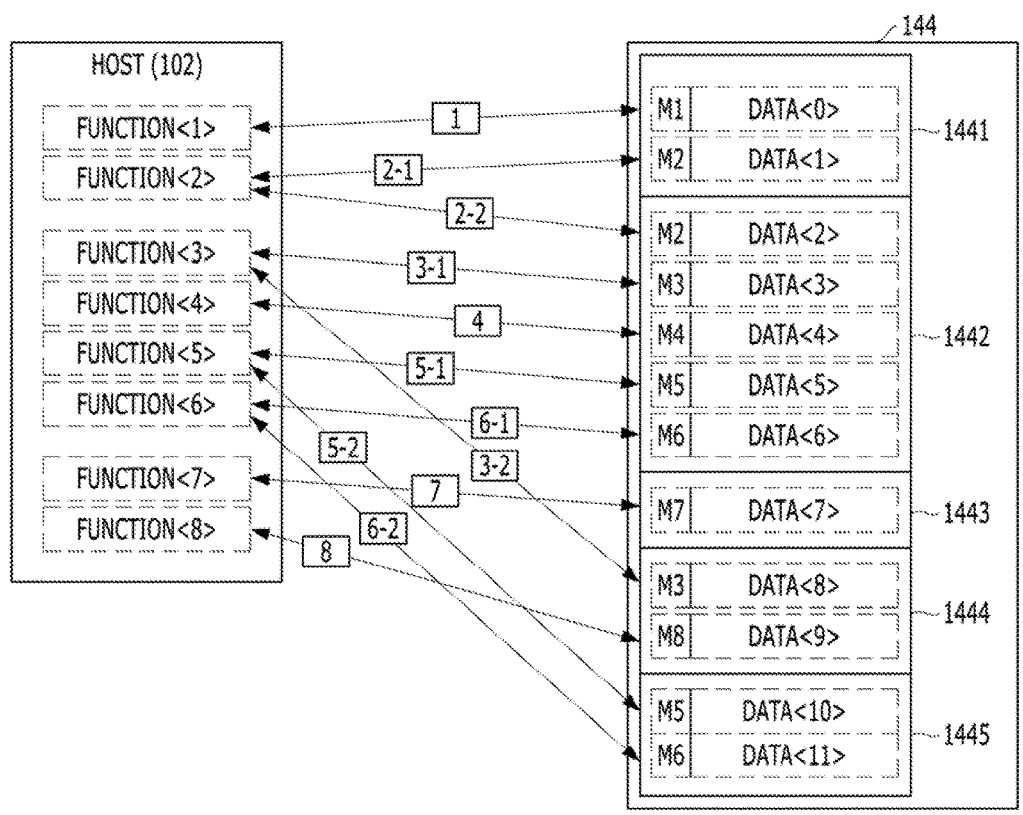
FIG. 4 illustrates a memory management method, according to an embodiment of the present invention.

FIG. 4 illustrates a memory management method according to an embodiment of the present invention. The method of FIG. 4 may be applied to the memory 144 of FIGS. 1 to 3. For example, the method of FIG. 4 may be performed by the processor 134 of the memory controller 130 in FIG. 1.

Referring to FIG. 4, a plurality of operations FUNCTION<1:8> are performed in the host 102, as described above with reference to FIG. 3. The storage region of the memory 144 included in the memory system 110 is divided into a plurality of internal storage regions (e.g., internal storage regions 1441, 1442, 1443, 1444 and 1445), which correspond to the operations FUNCTION<1:8>.

Compared to what was described above with reference to FIG. 3, metadata M<1:8> are now stored in the internal storage regions 1441, 1442, 1443, 1444 and 1445 of the memory 144 along with the data DATA<0:11>.

First, it may be assumed that a total of 8 operations FUNCTION<1:8> are performed in the host 102. Herein, the 8 operations FUNCTION<1:8> may be the operations of reading/writing/erasing data from/to a memory device 150 of the memory system 110, and the operations of testing, debugging, coding and verifying the memory system 110. In short, the operations FUNCTION<1:8> performed in the host 102 signify all the operations performed by the host 102 to control the memory system 110.

Herein, the multiple operations FUNCTION<1:8> performed in the host 102 are illustrated to be eight operations, but this is for the sake of convenience in description, and it is also possible to perform more operations or less operations than the 8 operations.

As described with reference to FIGS. 2 and 3, the memory 144 included in the memory system 110 includes the first to fifth internal storage regions 1441, 1442, 1443, 1444 and 1445. In other words, an operation of dividing the storage region of the memory 144 into the multiple internal storage regions 1441, 1442, 1443, 1444 and 1445 according to the usage of the memory system 110 is performed first in the host 102.

Subsequently, when the host 102 requests the memory system 110 to write the data DATA<0:11> in the memory 144 of the memory system 110, the memory system 110 performs an operation of selecting one internal storage region among the internal storage regions 1441, 1442, 1443, 1444 and 1445 of the memory 144 based on the data characterization information of the data DATA<0:11> according to a write request transferred from the host 102.

After one internal storage region among the internal storage regions 1441, 1442, 1443, 1444 and 1445 of the memory 144 is selected based on the data characterization information of the write data DATA<0:11> transferred from the host 102, metadata M<1:8> including the data characterization information of the write data DATA<0:11> is generated, and the generated metadata M<1:8> is then stored in the selected internal storage region along with the write data DATA<0:11>.

In the illustrated example, the data characterization information of the write data DATA<0:11> transferred from the host 102 may be information on what operation among the operations FUNCTION<1:8> performed in the host 102 is to be performed when the write data DATA<0:11> are written in the memory device.

For example, when a first operation FUNCTION<1> is performed in the host 102 and the host 102 requests the memory system 110 to write the data DATA<0:11> in the memory 144, the data characterization information of the data DATA<0:11> is information representing that the first operation FUNCTION<1> is performed in the host 102. Therefore, the first internal storage region 1441 among the internal storage regions 1441, 1442, 1443, 1444 and 1445 of the memory 144 is selected corresponding to the first operation FUNCTION<1>. Subsequently, a first metadata M1 including information indicating that the first operation FUNCTION<1> is performed in the host 102 is generated and stored in the first internal storage region 1441 along with the data DATA<0:11> transferred from the host 102.

Also, when a second operation FUNCTION<2> is performed in the host 102 and the host 102 requests the memory system 110 to write the data DATA<0:11> in the memory 144, the data characterization information of the data DATA<0:11> is information representing that the second operation FUNCTION<2> is performed in the host 102. Therefore, one internal storage region between the first internal storage region 1441 and the second internal storage region 1442 is selected among the internal storage regions 1441, 1442, 1443, 1444 and 1445 of the memory 144 corresponding to the second operation FUNCTION<2>. Subsequently, a second metadata M2 including information indicating that the second operation FUNCTION<2> is performed in the host 102 is generated and stored in the internal storage region selected between the first internal storage region 1441 and the second internal storage region 1442 along with the data DATA<0:11> transferred from the host 102. Herein, whether the second metadata M2 and the data DATA<0:11> transferred from the host 102 are stored in the first internal storage region 1441 or the second internal storage region 1442 is decided based on how the second operation FUNCTION<2> is performed in the host 102.

Also, when a third operation FUNCTION<3> is performed in the host 102 and the host 102 requests the memory system 110 to write the data DATA<0:11> in the memory 144, the data characterization information of the data DATA<0:11> is information representing that the third operation FUNCTION<3> is performed in the host 102. Therefore, one internal storage region between the second internal storage region 1442 and the fourth internal storage region 1444 is selected among the internal storage regions 1441, 1442, 1443, 1444 and 1445 of the memory 144 corresponding to the third operation FUNCTION<3>. Subsequently, a third metadata M3 including information indicating that the third operation FUNCTION<3> is performed in the host 102 is generated and stored in the internal storage region selected between the second internal storage region 1442 and the fourth internal storage region 1444 along with the data DATA<0:11> transferred from the host 102. Herein, whether the third metadata M3 and the data DATA<0:11> transferred from the host 102 are stored in the second internal storage region 1442 or the fourth internal storage region 1444 is decided based on how the third operation FUNCTION<3> is performed in the host 102.

Also, when a fourth operation FUNCTION<4> is performed in the host 102 and the host 102 requests the memory system 110 to write the data DATA<0:11> in the memory 144, the data characterization information of the data DATA<0:11> is information representing that the fourth operation FUNCTION<4> is performed in the host 102. Therefore, the second internal storage region 1442 is selected among the internal storage regions 1441, 1442, 1443, 1444 and 1445 of the memory 144 corresponding to the fourth operation FUNCTION<4>. Subsequently, a fourth metadata M4 including information indicating that the fourth operation FUNCTION<4> is performed in the host 102 is generated and stored in the second internal storage region 1442 along with the data DATA<0:11> transferred from the host 102.

Also, when a fifth operation FUNCTION<5> is performed in the host 102 and the host 102 requests the memory system 110 to write the data DATA<0:11> in the memory 144, the data characterization information of the data DATA<0:11> is information representing that the fifth operation FUNCTION<5> is performed in the inside of the host 102. Therefore, one internal storage region between the second internal storage region 1442 and the fifth internal storage region 1445 is selected among the internal storage regions 1441, 1442, 1443, 1444 and 1445 of the memory 144 corresponding to the fifth operation FUNCTION<5>. Subsequently, a fifth metadata M5 including information indicating that the fifth operation FUNCTION<5> is performed in the host 102 is generated and stored in the internal storage region selected between the second internal storage region 1442 and the fifth internal storage region 1445 along with the data DATA<0:11> transferred from the host 102. Herein, whether the fifth metadata M5 and the data DATA<0:11> transferred from the host 102 are stored in the second internal storage region 1442 or the fifth internal storage region 1445 is decided based on how the fifth operation FUNCTION<5> is performed in the host 102.

Also, when a sixth operation FUNCTION<6> is performed in the host 102 and the host 102 requests the memory system 110 to write the data DATA<0:11> in the memory 144, the data characterization information of the data DATA<0:11> is information representing that the sixth operation FUNCTION<6> is performed in the host 102. Therefore, one internal storage region between the second internal storage region 1442 and the fifth internal storage region 1445 is selected among the internal storage regions 1441, 1442, 1443, 1444 and 1445 of the memory 144 corresponding to the sixth operation FUNCTION<6>. Subsequently, a sixth metadata M6 including information indicating that the sixth operation FUNCTION<6> is performed in the host 102 is generated and stored in the internal storage region selected between the second internal storage region 1442 and the fifth internal storage region 1445 along with the data DATA<0:11> transferred from the host 102. Herein, whether the sixth metadata M6 and the data DATA<0:11> transferred from the host 102 are stored in the second internal storage region 1442 or the fifth internal storage region 1445 is decided based on how the sixth operation FUNCTION<6> is performed in the host 102.

Also, when a seventh operation FUNCTION<7> is performed in the host 102 and the host 102 requests the memory system 110 to write the data DATA<0:11> in the memory 144, the data characterization information of the data DATA<0:11> is information representing that the seventh operation FUNCTION<7> is performed in the host 102. Therefore, the third internal storage region 1443 is selected among the internal storage regions 1441, 1442, 1443, 1444 and 1445 of the memory 144 corresponding to the seventh operation FUNCTION<7>. Subsequently, a seventh metadata M7 including information indicating that the seventh operation FUNCTION<7> is performed in the host 102 is generated and stored in the third internal storage region 1443 along with the data DATA<0:11> transferred from the host 102.

Also, when an eighth operation FUNCTION<8> is performed in the host 102 and the host 102 requests the memory system 110 to write the data DATA<0:11> in the memory 144, the data characterization information of the data DATA<0:11> is information representing that eighth operation FUNCTION<8> is performed in the host 102. Therefore, the fourth internal storage region 1444 is selected among the internal storage regions 1441, 1442, 1443, 1444 and 1445 of the memory 144 corresponding to the eighth operation FUNCTION<8>. Subsequently, an eighth metadata M8 including information indicating that the eighth operation FUNCTION<8> is performed in the host 102 is generated and stored in the fourth internal storage region 1444 along with the data DATA<0:11> transferred from the host 102.

To sum up, when the write data DATA<0:11> transferred from the host 102 is received, the memory system 110 generates the metadata M<1:8> including the data characterization information of the write data DATA<0:11> transferred from the host 102, and stores the generated metadata M<1:8> in the memory 144 along with the data characterization information of the write data DATA<0:11> transferred from the host 102. Therefore, each of the internal storage regions 1441, 1442, 1443, 1444 and 1445 of the memory 144 not only stores the data DATA<0:11> but also stores the metadata M<1:8> representing what operation the stored data DATA<0:11> correspond to.

Meanwhile, described in the above is that the number of the data DATA<0:11> transferred from the host 102 to the memory 144 of the memory system 110 and stored in the memory 144 of the memory system 110 is assumed to be 12 data DATA<0:11> and that a zeroth data DATA0 corresponds to the first operation FUNCTION<1> in the host 102; a first data DATA1 and a second data DATA2 correspond to the second operation FUNCTION<2> in the host 102; a third data DATA3 and an eighth data DATA8 correspond to the third operation FUNCTION<3> in the host 102; a fourth data DATA4 corresponds to the fourth operation FUNCTION<4> in the host 102; a fifth data DATA5 and a tenth data DATA10 correspond to the fifth operation FUNCTION<5> in the host 102; a sixth data DATA6 and an eleventh data DATA11 correspond to the sixth operation FUNCTION<6> in the host 102; a seventh data DATA7 corresponds to the seventh operation FUNCTION<7> in the host 102; and a ninth data DATA9 corresponds to the eighth operation FUNCTION<8> in the host 102. However, the above description is simply no more than an example. It is actually difficult to predict to what operation among the operations FUNCTION<1:8> of the host 102, the data DATA<0:11> transferred from the host 102 to the memory 144 corresponds to. The memory system 110 just includes the data characterization information of the data DATA<0: 11> in the metadata M<1:8> and stores the metadata M<1: 8> including the data characterization information in the memory 144, when the data characterization information of the data DATA<0:11> is transferred from the host 102 to the memory system 110 along with the data DATA<0:11>. The method of FIG. 4 may be performed by the processor 134 of the memory controller 130 in FIG. 1.

Figure 5A:
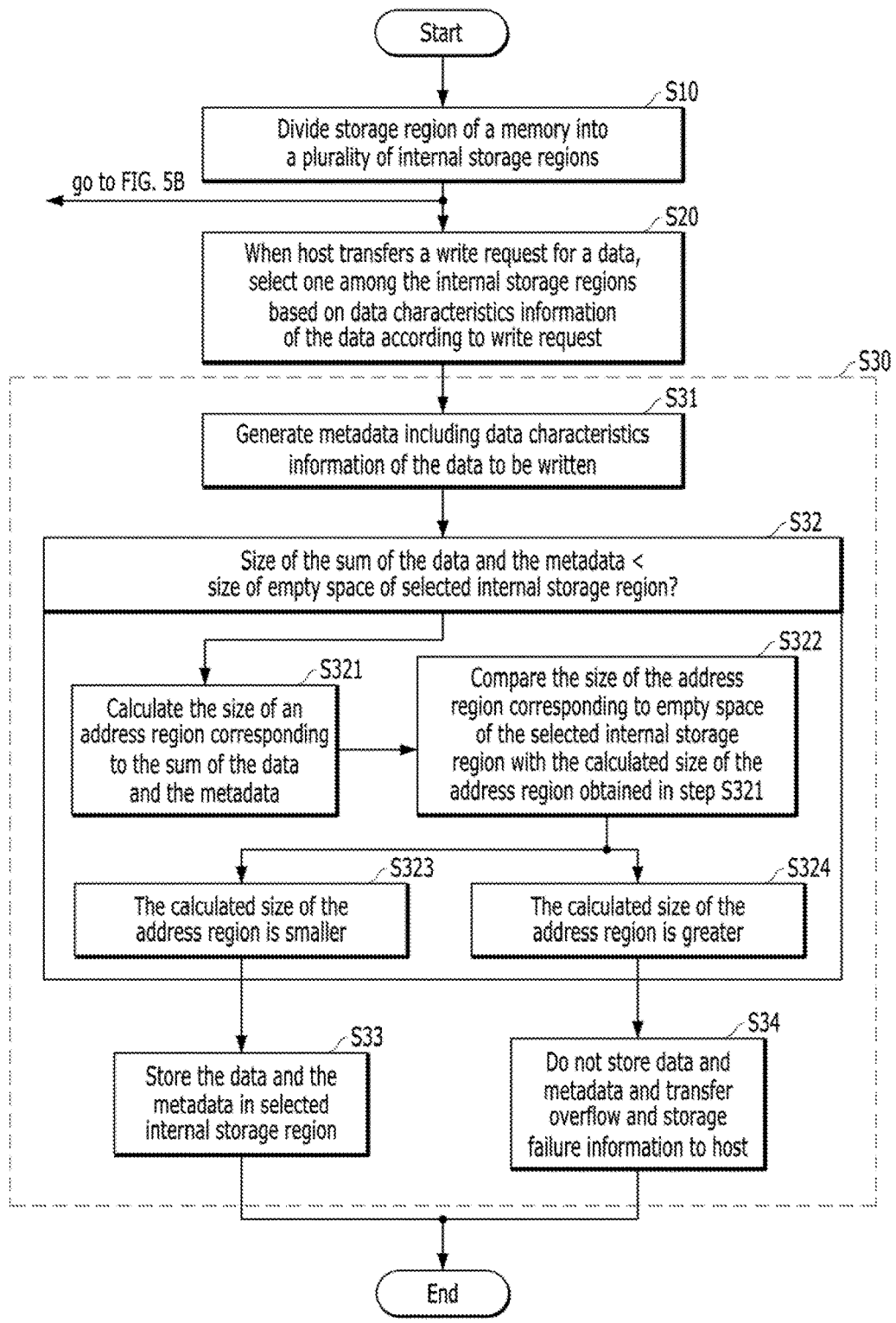
FIGS. 5A and 5B are flowcharts illustrating operations of the memory management method of FIG. 4, according to an embodiment of the present invention.

Referring to FIG. 5A, an operation performed when a write request for the data DATA<0:11> is transferred from the host 102 is described in detail among the memory management method of FIG. 4, according to an embodiment of the present invention.

First, in step S10, the storage region of the memory 144 of the memory system 110 is divided into a plurality of internal storage regions, for example five internal storage regions 1441, 1442, 1443, 1444 and 1445 as illustrated in FIG. 4.

In step S20, when the host 102 requests the memory system 110 to write the data DATA<0:11> in the memory 144 of the memory system 110 after the step S10, one internal storage region among the plurality of the internal storage regions 1441, 1442, 1443, 1444 and 1445 of the memory 144 is selected based on the data characterization information of the write data DATA<0:11> transferred from the host 102.

In step S30, the metadata M<1:8> which includes the data characterization information of the write data DATA<0:11> is generated, and the generated metadata M<1:8> is stored in the selected internal storage region along with the write data DATA<0:11>.

Hereafter, the operation in step S30 is described in more detail. The step S30 includes steps S31, S32, S33 and S34.

In step S31, the metadata M<1:8> including the data characterization information of the write data DATA<0:11> transferred from the host 102 is generated. Since the data characterization information of the write data DATA<0:11> has been described above with reference to FIG. 4, further description thereof is omitted herein.

In step S32, the sum of the size of the write data DATA<0:11> and the size of the metadata M<1:8> generated in step S31 is compared with the size of the empty space of the selected internal storage region 1441, 1442, 1443, 1444 or 1445, which is selected in step S20.

When it turns out in step S32 that the sum of the size of the write data DATA<0:11> and the size of the metadata M<1:8> generated in step S31 is not greater than the size of the empty space of the selected internal storage region 1441, 1442, 1443, 1444 or 1445, the write data DATA<0:11> and the metadata M<1:8> generated in the operation of step S31 are stored in the empty space of the selected internal storage region 1441, 1442, 1443, 1444 or 1445, which is selected in the step S20, in step S33.

When it turns out in step S32 that the sum of the size of the write data DATA<0:11> and the size of the metadata M<1:8> generated in step S31 is greater than the size of the empty space of the selected internal storage region, the write data DATA<0:11> and the metadata M<1:8> generated in the operation of the step S31 are not stored in the empty space of the selected internal storage region, (which was selected in step S20). Accordingly, overflow and storage failure information is transferred to the host 102 in step S34.

Referring back to FIG. 4, an example of the operations of the steps S31 to S34 will now be described.

In the first place, it may be assumed that the third operation FUNCTION<3> is performed in the host 102 and a third data DATA3 is requested to be written in the second internal storage region 1442 of the memory 144. In step S31, the data characterization information of the third data DATA3 is generated as the third metadata M3. The data characterization information of the third data DATA3 is the information representing that the third data DATA3 requested to be written in the second internal storage region 1442 of the memory 144 is transferred to the memory system 110 through the third operation FUNCTION<3> performed in the host 102.

After the data characterization information of the third data DATA3 is generated as the third metadata M3, it is determined in step S32 whether the sum of the size of the third data DATA3 and the size of the third metadata M3 is greater than the size of the empty space of the second internal storage region 1442.

When the sum of the size of the third data DATA3 and the size of the third metadata M3 is not greater than the size of the empty space of the second internal storage region 1442, the third data DATA3 and the third metadata M3 are stored in the second internal storage region 1442 in the step S33.

When the sum of the size of the third data DATA3 and the size of the third metadata M3 is greater than the size of the empty space of the second internal storage region 1442, the third data DATA3 and the third metadata M3 are not stored in the second internal storage region 1442 and instead overflow and storage failure information is transferred to the host 102 in step S34.

Herein, the overflow and storage failure information transferred to the host 102 represents that the third data DATA3 cannot be stored in the memory 144 because an unpredictable error occurs in the third operation FUNCTION<3> performed in the host 102. In other words, the host 102 may be informed that a problem has occurred in the write operation of the third operation FUNCTION<3> performed in the host 102 and, hence, the host 102 may appropriately cope with the problem.

Hereafter, the operation of the step S32 is described in detail. The step S32 includes steps S321, S322, S323 and S324.

In step S321, the size of an address region corresponding to the sum of the write data DATA<0:11> and the metadata M<1:8> generated in the operation of the step S31 is calculated.

In step S322, the size of the address region calculated in the step S321 is compared with the size of an address region corresponding to the empty space of the selected internal storage region 1441, 1442, 1443, 1444 or 1445, which is selected in step S20.

When in step S323 the size of the address region calculated in step S321 is smaller than the size of the address region corresponding to the empty space of the selected internal storage region 1441, 1442, 1443, 1444 or 1445, which is selected in the step S20, the third data DATA3 and the third metadata M3 are written in the second internal storage region 1442 in step S33.

When it turns out in the step S324 that the size of the address region calculated in the step S321 is greater than the size of the address region corresponding to the empty space of the selected internal storage region 1441, 1442, 1443, 1444 or 1445, which is selected in the step S20, the third data DATA3 and the third metadata M3 are not written in the second internal storage region 1442 and instead overflow and storage failure information is transferred to the host 102 in the step S34.

Figure 5B:
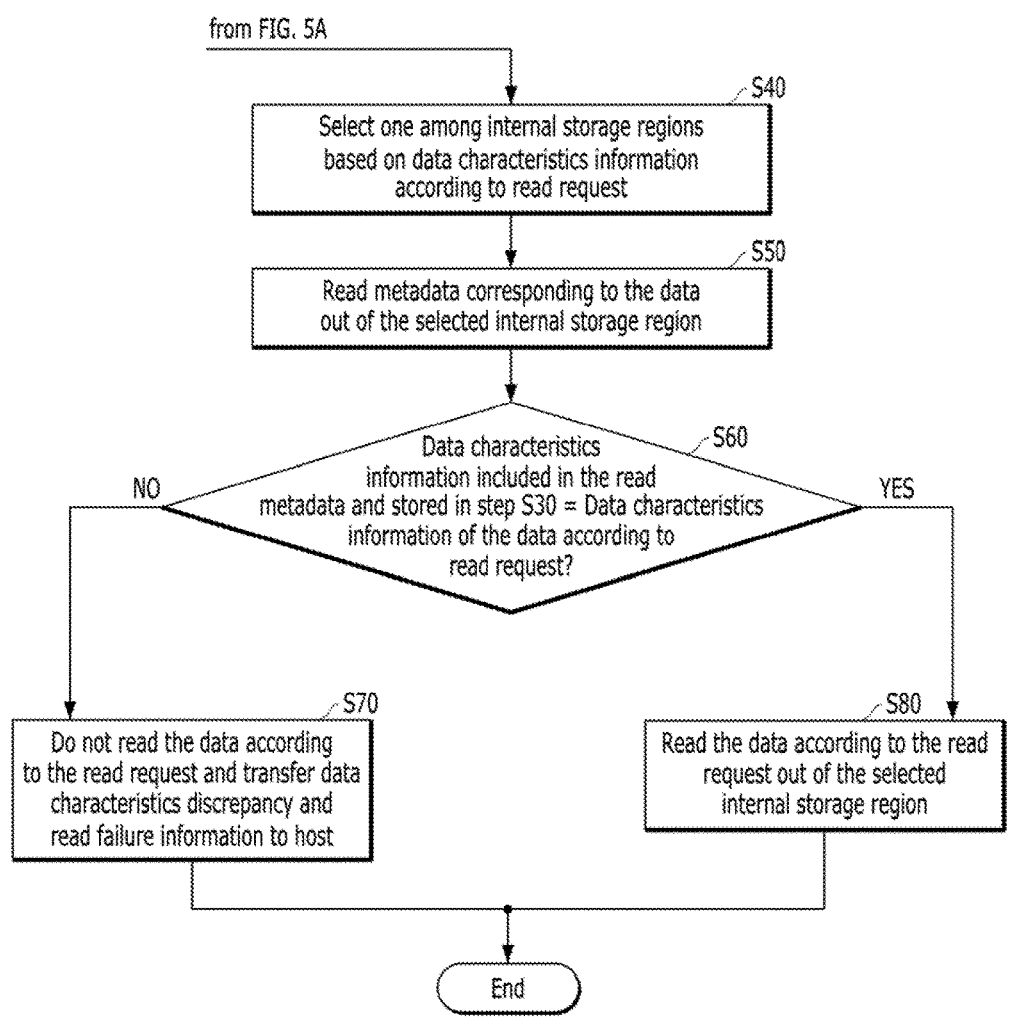

Referring to FIG. 5B, an operation performed when a read request for the data DATA<0:11> is transferred from the host 102 is described in detail among the memory management method of FIG. 4 according to the embodiment of the present invention.

First, in step S10, the storage region of the memory 144 of the memory system 110 is divided into a plurality of internal storage regions, for example the five internal storage regions 1441, 1442, 1443, 1444 and 1445 according to the operations of the host 102, as described above with reference to FIGS. 4 and 5A.

When the host 102 requests the memory system 110 to read the data DATA<0:11> from the memory 144 of the memory system 110 after the step S10, one internal storage region among the internal storage regions 1441, 1442, 1443, 1444 and 1445 of the memory 144 is selected in step S40 based on the data characterization information of the data DATA<0:11> according to the read request transferred from the host 102.

In step S50, the metadata M<1:8> corresponding to the read-requested data DATA<0:11> is read from the selected internal storage region which is selected in the step S40. In other words, the operation of step S50 is an operation of reading the metadata M<1:8> corresponding to the read-requested data DATA<0:11> out of the selected internal storage region 1441, 1442, 1443, 1444 or 1445, which is selected in the step S40, before reading the data DATA<0:11> according to the read request transferred from the host 102 out of the selected internal storage region 1441, 1442, 1443, 1444 or 1445.

Subsequently, in step S60, it is determined whether the data characterization information of the data DATA<0:11> that is stored through the operation of the step S30 according to the write request transferred from the host 102 and included in the metadata M<1:8>, which is read in the step S50, is the same as the data characterization information of the data DATA<0:11> according to the read request transferred from the host 102.

When the data characterization information of the data DATA<0:11> that is stored through the operation of step S30 according to the write request transferred from the host 102 and included in the metadata M<1:8>, which is read in the step S50 is the same as the data characterization information of the data DATA<0:11> according to the read request transferred from the host 102 (step S60, YES), the data DATA<0:11> according to the read request transferred from the host 102 is read out of the selected internal storage region 1441, 1442, 1443, 1444 or 1445 in step S80.

When the data characterization information of the data DATA<0:11> that is stored through the operation of the step S30 according to the write request transferred from the host 102 and included in the metadata M<1:8>, which is read in the step S50 is not the same as the data characterization information of the data DATA<0:11> according to the read request transferred from the host 102 (step S60, NO), the data DATA<0:11> according to the read request transferred from the host 102 is not read out of the selected Internal storage region 1441, 1442, 1443, 1444 or 1445 and data characteristics discrepancy and read failure information is transferred to the host 102 in step S70.

Referring back to FIG. 4, the operations of steps S40 to S80 are described, hereafter, with the help of an example.

First, it may be assumed that the data DATA<0:11> are stored in the multiple internal storage regions 1441, 1442, 1443, 1444 and 1445 of the memory 144 as illustrated in FIG. 4. Also, it may be assumed that there is a normal case where the third data DATA3 is requested to be read out of the memory 144 as the third operation FUNCTION<3> is performed in the host 102, and there is an abnormal case where the fourth data DATA4 is requested to be read out of the memory 144 as the third operation FUNCTION<3> is performed in the host 102.

Since both of the third data DATA3 and the fourth data DATA4 according to the read request transferred from the host 102 are stored in the second internal storage region 1442 among the internal storage regions 1441, 1442, 1443, 1444 and 1445 of the memory 144, the second internal storage region 1442 is selected in step S40.

After the second internal storage region 1442 is selected in step S40, the third metadata M3 corresponding to the third data DATA3 and the fourth metadata M4 corresponding to the fourth data DATA4 are read out of the second internal storage region 1442 in step S50. Herein, the third data DATA3 and the fourth data DATA4 that are requested by the host 102 to be read are not read in step S50.

After the third metadata M3 is read in the step S50, as a first operation, it is determined in step S60 whether the data characterization information of the third data DATA3 that is stored through the operation of step S30 according to the write request transferred from the host 102 and included in the third metadata M3 is the same as the data characterization information of the third data DATA3 according to the read request transferred from the host 102. Likewise, after the fourth metadata M4 is read in the step S50, as a second operation, it is determined in step S60 whether the data characterization information of the fourth data DATA4 that is stored through the operation of the step S30 according to the write request transferred from the host 102 and included in the fourth metadata M4 is the same as the data characterization information of the fourth data DATA4 according to the read request transferred from the host 102.

Hereafter, the first operation of step S60 is described.

First, the data characterization information of the third data DATA3 according to the write request transferred from the host 102 which are included in the third metadata M3 corresponding to the third data DATA3 that is stored in the second internal storage region 1442 of the memory 144 represents that the third operation FUNCTION<3> is performed in the host 102.

Also, since the third data DATA3 is requested to be read while the host 102 performs the third operation FUNCTION<3>, the data characterization information of the third data DATA3 according to the read request transferred from the host 102 represents that the third operation FUNCTION<3> is performed in the host 102.

This shows that the data characterization information of the third data DATA3 according to the write request transferred from the host 102 and included in the third metadata M3 corresponding to the third data DATA3 that is stored in the second internal storage region 1442 of the memory 144 is the same (step S60, YES) as the data characterization information of the third data DATA3 according to the read request transferred from the host 102. Therefore, in step S80, the third data DATA3 according to the read request transferred from the host 102 is read out of the selected second internal storage region 1442, which is selected in step S40.

Hereafter, the second operation of step S60 is described.

First, the data characterization information of the fourth data DATA4 according to the write request transferred from the host 102 which is included in the fourth metadata M4 corresponding to the fourth data DATA4 that is stored in the second internal storage region 1442 of the memory 144 represents that the fourth operation FUNCTION<4> is performed in the host 102.

Also, since the fourth data DATA4 is requested to be read while the host 102 performs the third operation FUNCTION<3>, the data characterization information of the fourth data DATA4 according to the read request transferred from the host 102 represents that the third operation FUNCTION<3> is performed in the host 102.

This shows that the data characterization information of the fourth data DATA4 according to the write request transferred from the host 102 and included in the fourth metadata M4 corresponding to the fourth data DATA4 that is stored in the second internal storage region 1442 of the memory 144 is not the same (step S60, NO) as the data characterization information of the fourth data DATA4 according to the read request transferred from the host 102. Therefore, in the step S70, the fourth data DATA4 according to the read request transferred from the host 102 is not read out of the selected second internal storage region 1442, which is selected in step S40, and data characteristics discrepancy and read failure information is transferred to the host 102.

Herein, the data characteristics discrepancy and read failure information transferred to the host 102 in step S70 informs the host 102 that an unpredictable error occurs in the third operation FUNCTION<3> performed in the host 102 and the fourth data DATA4, which cannot be read through the third operation FUNCTION<3>, is tried to be read. In other words, through the operation of the step S70, the host 102 may be informed that a problem has occurred in the read operation of the third operation FUNCTION<3> performed in the host 102 and the host 102 may appropriately cope with the problem.

According to the embodiments of the present invention, when a host requests a memory system to write a data in a memory of the memory system, data characterization information of the data to be stored upon the write request from the host is stored along with the write data as metadata.

When the data stored upon the write request from the host is requested to be read, the data characterization information of the stored data according to a read request may be compared with the data characterization information of the stored data according to the write request that is included in the metadata. Through a comparison of data characterization information an erroneous read request may thus be detected.

While the present invention has been described with respect to the specific embodiments, it will be apparent to those skilled in the art that various changes and modifications may be made without departing from the spirit and scope of the invention as defined in the following claims.

What is claimed is:

1. A method for managing a memory, comprising:
receiving a write request from a host;
selecting an internal storage region among a plurality of internal storage regions of the memory based on data characterization information of a data received from a host according to the write request from a host;
generating a metadata including the data characterization information of the data according to the write request; and
storing the metadata along with the data in the selected internal storage region,
wherein the storing of the metadata along with the data in the selected internal storage region includes:
checking out whether a sum of a size of the data and a size of the metadata is greater than a size of an empty space of the selected internal storage region, which is selected based on the data characterization information of the data according to the write request,
wherein the checking out of whether the sum of the size of the data and the size of the metadata is greater than the size of the empty space of the selected internal storage region, which is selected based on the data characterization information of the data according to the write request includes:

calculating a size of an address region corresponding to the sum, and comparing the calculated size of the address region with a size of a selected address region corresponding to the empty space of the selected internal storage region, which is selected based on the data characterization information of the data according to the write request;

when the calculated size of the address region is greater than the size of the selected address region, confirming that the size of the sum is greater than the size of the selected internal storage region; and when the calculated size of the address region is not greater than the size of the selected address region, confirming that the size of the sum is not greater than the size of the selected internal storage region.

2. The method of claim 1, further comprising:

receiving a read request for the data received from the host, after the data is stored along with the metadata in the selected internal storage region, selecting one internal storage region among the plurality of the internal storage regions based on the data characterization information of the data according to the read request;

reading the metadata corresponding to the data according to the read request out of the selected internal storage region, which is selected based on the data characterization information of the data according to the read request;

determining whether the data characterization information of the data according to the write request that is included in the read metadata is the same as the data characterization information of the data according to the read request; and reading the data according to the read request out of the selected internal storage region, which is selected based on the data characterization information of the data according to the read request when the data characterization information of the data according to the write request that is included in the read metadata is the same as the data characterization information of the data according to the read request.

3. The method of claim 2, further comprising:

when the data characterization information of the data according to the write request that is included in the read metadata is not the same as the data characterization information of the data according to the read request, not reading the data according to the read request.

4. The method of claim 3, further comprising:

transferring data characteristics discrepancy and read failure information to the host.

5. The method of claim 1, wherein the storing of the metadata along with the data in the selected internal storage region further includes:

when the sum of the size of the data and the size of the metadata is not greater than the size of the empty space of the selected internal storage region, storing the data and the metadata in the selected internal storage region, which is selected based on the data characterization information of the data according to the write request.

6. The method of claim 5, wherein the storing of the metadata along with the data in the selected internal storage region further includes:

when the sum of the size of the data and the size of the metadata is greater than the size of the empty space of the selected internal storage region, not storing the data and the metadata in the selected internal storage region, which is selected based on the data characterization information of the data according to the write request.

7. The method of claim 6, wherein the storing of the metadata along with the data in the selected internal storage region further includes:

when the sum of the size of the data and the size of the metadata is greater than the size of the empty space of the selected internal storage region, transferring overflow and storage failure information to the host.

8. A memory controller, comprising:

a memory; and a processor, wherein the processor is suitable for:

dividing a storing region of the memory into a plurality of internal storage regions;

selecting one internal storage region among the plurality of the internal storage regions based on data characterization information of a data according to a write request from a host;

generating a metadata including the data characterization information of the data according to the write request;

checking out whether a sum of a size of the data and a size of the metadata is greater than a size of an empty space of the selected internal storage region, which is selected based on the data characterization information of the data according to the write request; and storing the metadata along with the data in the selected internal storage region, wherein the processor is suitable for checking out whether a sum of a size of the data and a size of the metadata is greater than a size of an empty space of the selected internal storage region, which is selected based on the data characterization information of the data according to the write request by including:

calculating a size of an address region corresponding to the sum, and comparing the calculated size of the address region with a size of a selected address region corresponding to the empty space of the selected internal storage region, which is selected based on the data characterization information of the data according to the write request;

when the calculated size of the address region is greater than the size of the selected address region, confirming that the size of the sum is greater than the size of the selected internal storage region; and when the calculated size of the address region is not greater than the size of the selected address region, confirming that the size of the sum is not greater than the size of the selected internal storage region.

9. The memory controller of claim 8, wherein the processor is further suitable for:

when a read request for the data is received from the host, after the data is stored along with the metadata in the selected internal storage region, selecting one internal storage region among the plurality of the internal storage regions based on the data characterization information of the data according to the read request;

reading the metadata corresponding to the data according to the read request out of the selected internal storage region, which is selected based on the data characterization information of the data according to the read request, and figuring out whether the data characterization information of the data according to the write request that is included in the read metadata is the same as the data characterization information of the data according to the read request; and when the data characterization information of the data according to the write request that is included in the read metadata is the same as the data characterization information of the data according to the read request, reading the data according to the read request out of the selected internal storage region, which is selected based on the data characterization information of the data according to the read request.

10. The memory controller of claim 9, wherein the processor is further suitable for:

when the data characterization information of the data according to the write request that is included in the read metadata is not the same as the data characterization information of the data according to the read request, not reading the data according to the read request.

11. The memory controller of claim 10, wherein the processor is further suitable for:

transferring data characteristics discrepancy and read failure information to the host.

12. The memory controller of claim 8, wherein the processor is further suitable for:

when the sum of the size of the data and the size of the metadata is not greater than the size of the empty space of the selected internal storage region, storing the data and the metadata in the selected internal storage region, which is selected based on the data characterization information of the data according to the write request.

13. The memory controller of claim 12, wherein the processor is further suitable for:

when the sum of the size of the data and the size of the metadata is greater than the size of the empty space of the selected internal storage region, not storing the data and the metadata in the selected internal storage region, which is selected based on the data characterization information of the data according to the write request.

14. The memory controller of claim 13, wherein the processor is further suitable for:

when the sum of the size of the data and the size of the metadata is greater than the size of the empty space of the selected internal storage region, transferring overflow and storage failure information to the host.

* * * * *